United States Patent [19]

Krouse

[11] 3,849,012
[45] Nov. 19, 1974

[54] BUILDING STRUCTURE FASTENER
[76] Inventor: Theodore L. Krouse, 113 W. South St., Monticello, Iowa 52310
[22] Filed: Oct. 24, 1973
[21] Appl. No.: 409,286

[52] U.S. Cl.................... 403/188, 52/90, 52/665, 29/464, 29/271, 403/353, 403/316, 24/224 SS
[51] Int. Cl.............................................. F16b 9/02
[58] Field of Search ..... 52/90, 93, 593, 127, 758 R, 52/758 F, 665; 403/13, 188, 189, 316, 353, 376, 388; 29/433, 464, 271, 273; 24/224 SS, 224 LS

[56] References Cited
UNITED STATES PATENTS

| | | | |
|---|---|---|---|
| 1,804,420 | 5/1931 | Kelley | 29/433 UX |
| 2,321,916 | 6/1943 | Ingerman | 403/353 X |
| 3,058,549 | 10/1962 | Anderson | 52/90 X |
| 3,174,594 | 5/1965 | Krausz | 52/758 R X |
| 3,389,453 | 6/1968 | Tarter et al. | 29/273 |
| 3,813,735 | 6/1974 | Thiermann | 403/388 X |

FOREIGN PATENTS OR APPLICATIONS
668,936   1/1952   Great Britain ..................... 403/353

Primary Examiner—Jordan Franklin
Assistant Examiner—Wayne L. Shedd
Attorney, Agent, or Firm—Zarley, McKee, Thomte & Voorhees

[57] ABSTRACT

A clip is provided on the rafters for connecting purlins to the rafters. The clip is provided with a pair of posts having enlarged heads and each head includes a recess. A resilient tab is formed out of the clip material. A purlin is provided with a pair of keyhole-shaped openings including an enlarged opening having a slot connected thereto. The purlin is guided onto the post by a guide pin being positioned in one of the enlarged openings with the inner end of the pin in the recess of the head. The purlin is guided onto the clip with the post extending through the respective keyhole openings in the purlin and the retaining lip engages the side wall of the enlarged opening when the purlin is moved laterally on the clip whereupon the posts move into the slots of the keyhole openings and the lip snaps into locking engagement with the enlarged opening.

7 Claims, 5 Drawing Figures

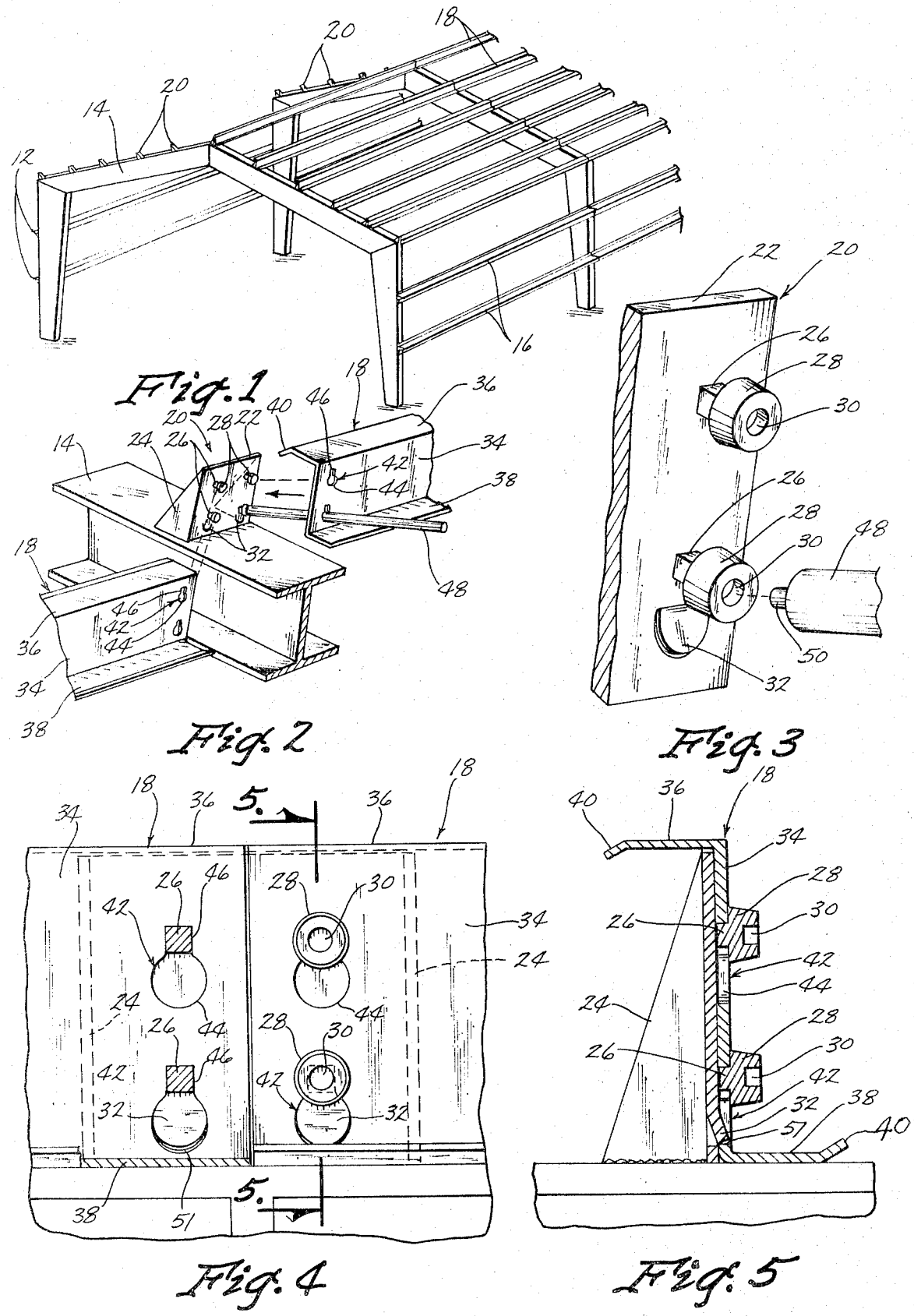

BUILDING STRUCTURE FASTENER

In the construction of metal buildings it is quite time consuming to connect purlins to rafters through the use of conventional bolt fasteners. This invention contemplates the use of a quick-attach connection for connecting the purlins to rafters or girts to columns. Through the use of a guide pin the pair of openings in the end of the purlins are guided onto the posts on the clip carried on the rafter. Once the heads on the post have passed through the enlarged openings on the purlin the purlin is moved laterally such that the posts move into the slots of the keyhole openings and the lip is depressed inwardly and then snaps outwardly into engagement with the enlarged opening. The spacing of the heads from the clip or mounting plate is such that a tight fit is provided. The purlin is locked against movement in all directions and particularly against movement laterally wherein the lip stops movement in one direction and the post engaging the end of the slots limits movement in the opposite direction.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of a building constructed using the fasteners of this invention;

FIG. 2 is an exploded fragmentary view showing a purlin being mounted;

FIG. 3 is a fragmentary enlarged view of the mounting plate fastening elements;

FIG. 4 is a fragmentary elevation view of the purlin and mounting plate structure; and FIG. 5 is a cross sectional view taken along line 5 — 5 in FIG. 4.

The fastener of this invention is seen in use on a metal building including columns 12 supporting spans 14. Girts 16 are provided on the columns and purlins 18 are connected to the spans. These connections are made by clips or mounting plates 20 being provided on the columns and spans.

In FIG. 2 the clip 20 is seen to include the mounting plate portion 22 and side support walls 24 which serve to rigidify the connection of the mounting plate to the span 14. The mounting plate 22 will connect the purlins 18 to the span 14 and thus two vertically oriented rows of fastening elements are provided on the mounting plate. Each row includes a pair of posts 26 square in cross section and having enlarged circular in cross section heads 28 thereon. The heads taper to a smaller diameter away from the mounting plate and each includes a guide pin recess 30 in its axial center facing outwardly. A lip 32 is deformed out of the mounting plate 22 and is adapted to be yieldably depressed toward the plate and then spring outwardly again.

Each of the purlins 18 include a main wall 34 having oppositely extending top and bottom walls 36 and 38. Oppositely extending flanges 40 are provided on the walls 36 and 38. The main wall 34 includes keyhole-shaped openings 42 which each include enlarged openings 44 connecting with slots 46.

The assembly of the purlins to the mounting plate is accomplished as seen in FIG. 2 by a guide rod 48 being employed having a pin 50 on its inner end. The rod is extended through one of the keyhole openings 42 with the pin 50 in a recess 30. The purlin is then guided onto the mounting plate with the heads extending through the enlarged openings 44. The purlin is then moved downwardly such that the posts 26 move into the slots 46 and the plate 34 depresses the lip 32 momentarily inwardly until it is allowed to snap outwardly into engagement with the enlarged opening side wall 51, as seen in FIG. 5, whereupon the purlin is locked in place against any further movement. Lateral movement is limited by the posts 26 engaging the ends of the slots 46 and the lip 32 engaging the enlarged opening side wall edge 51. Separation between the mounting plate and the purlin is limited by the heads 28 overlapping the slots 46. The bottom wall 38 engages the top of the span thus giving further stability while the top wall 36 engages the top edge of the mounting plate 20.

Thus it is seen that two purlin ends may be mounted in end-to-end engagement on a single mounting plate on one span member and this may be quickly accomplished through the use of the mounting guide rod 48 with no bolts or other special tools being required.

I claim:

1. A building structure comprising,
a support member,
a mounting plate on said support member and having a post with a head on its outer end, and a locking tab on said mounting plate adjacent said post and adapted to be resiliently deflected towards said plate and said head having a larger cross sectional area than said post, and
a structural member having an enlarged opening and a slot extending from said opening such that said head on said post may be positioned through s said opening and upon said structural member being moved said post moves into said slot having a size smaller than said head thereby limiting said head against passing through it and said locking tab being resiliently depressed as said structural member is moved until it drops into said opening and engages the edge thereof to limit movement of said structural member, said post engaging the end of said slot and the locking tab engaging said enlarged opening with said post head being over said slot.

2. The structure of claim 1 wherein said tab is deformed out of said mounting plate.

3. The structure of claim 1 wherein a second post having an enlarged head is provided on said mounting plate for being positioned in a second enlarged opening connected to a slot such that said head on said second post may be positioned in said second opening and upon said structural member being moved said post moves into said slot having a size smaller than said head thereby limiting said head against passing through it.

4. The structure of claim 3 wherein said first and second posts have flat side walls to engage the side edges of said slot to limit turning of said structural member.

5. The structure of claim 4 wherein said first and second heads are circular in cross section and said openings are circular to receive said heads.

6. The structure of claim 3 wherein said heads include a recess opening outwardly on their outer face for receiving a guide pin.

7. The structure of claim 3 wherein said heads are circular in cross section and have an outer peripheral wall which tapers outwardly to a smaller diameter.

* * * * *